United States Patent [19]

Puvogel

[11] Patent Number: 4,755,922
[45] Date of Patent: Jul. 5, 1988

[54] DC TO DC CONVERTER FOR ETHERNET TRANSCEIVER

[75] Inventor: John M. Puvogel, Lawndale, Calif.

[73] Assignee: Xerox Corporation, Stamford, Conn.

[21] Appl. No.: 30,650

[22] Filed: Mar. 26, 1987

[51] Int. Cl.$^4$ .............................................. H02M 3/335
[52] U.S. Cl. .......................................... 363/21; 363/97
[58] Field of Search ............................ 363/21, 97, 131

[56] References Cited

U.S. PATENT DOCUMENTS

| | | | |
|---|---|---|---|
| 4,318,168 | 3/1982 | Faxon | 363/21 X |
| 4,410,936 | 10/1983 | Suzuki | 363/21 X |
| 4,504,898 | 3/1985 | Pilakaitis et al. | 363/21 X |
| 4,593,346 | 6/1986 | Nooijen et al. | 363/21 |
| 4,692,852 | 9/1987 | Hoover | 363/21 |
| 4,692,853 | 9/1987 | de Sartre et al. | 363/97 X |

OTHER PUBLICATIONS

Reilly, David, "25W Switching Regulator Costs <$10", EDN, Aug. 23, 1984, pp. 235–236.
Reilly, David, "A 25 Watt Off-Line Flyback Switching Regulator", UNITRODE Application Note U-96.
Motorola Semiconductors, "DC to DC Converter Control Circuits", Mar. 1983, ADI-727.

Primary Examiner—Patrick R. Salce
Assistant Examiner—Marc S. Hoff
Attorney, Agent, or Firm—Franklyn C. Weiss

[57] ABSTRACT

This invention relates to a direct current to direct current power converter for use within a transceiver module which connects a user host station, i.e., terminal, printer, workstation, etc., to an Ethernet coaxial cable. The converter provides a adequately regulated DC output voltage, provides high voltage isolation between the Ethernet cable and the operating workstation, and which utilizes fewer parts than known similar power supplies, soft start threshold provisions, overload protection, an LED (light emitting diode) performance indicator, and a trimmer for precise output voltage adjustment.

3 Claims, 2 Drawing Sheets

DC TO DC CONVERTER FOR ETHERNET TRANSCEIVER

This invention relates to a direct current to direct current power converter for use within the transceiver module which connects a user host station, i.e., terminal, printer, workstation, etc., to an Ethernet coaxial cable. The converter provides for a regulated DC output voltage and provides high voltage isolation between the Ethernet cable and the operating workstation.

BACKGROUND OF THE INVENTION

U.S. Pat. No. 4,063,220, which issued Dec. 13, 1977, entitled "Multipoint Data Communication System With Collision System With Collision Detection", discloses a bit serial receiver network continuously connected to a plurality of communicating devices. Such is accomplished by forming the network of any one of a plurality of transmitting media, such as coaxial cable, optical fiber or other, connected together into one branched network by constantly active devices, like repeaters, by which communications necessarily adapted to one medium are translated into another medium. The patent further goes on to state that distributed along the communicating cable network are a plurality of stations, each including a using device generally categorized as either a computer, an auxiliary memory, or an input/output terminal. Each using host device, whether it be a computer or a remote terminal, is tied to the coaxial cable by way of a T-connector, or tap, connecting to a transceiver in series with an interface stage which in turn connects to the using device.

Three signals (transmit, receive, and collision) and power are transferred through the drop cable which connects the host equipment with the transceiver module. Host generated transmit signals are transferred to the transceiver. Transceiver generated receive and collision signals are transferred to the host equipment. Power for energizing the transceiver circuitry is transferred from the host source.

The system described is generally now publicly known as an Ethernet connection which, as set forth above, employs a drop cable between the transceiver module and the user host equipment. The transceiver module is attached to the Ethernet coaxial cable. User host equipment is a terminal, personal computer, workstation, printer, file server, gateway, etc.

The power, as set forth above, is provided to the transceiver module by the host equipment. However, the voltage supplied by said host could be within a range of voltages, typically between 11 volts DC and 16 volts DC, but the output power to drive the transceiver circuitry within the module must be voltage regulated and electrically isolated from the host source. A typical output voltage could be, for example, 9 volts DC. In addition, the Ethernet coaxial cable must be electrically isolated from host voltage references. Since the Ethernet cable is, by its very nature, a medium distance wire connection between remote operating host stations, reference voltage surges, or spikes, are typical and must be accounted for, or the voltage surge could, at worst, destroy the operating host unit, or, at best, cause a loss of data at the host station.

With the advent of LSI (large scale integrated circuitry), the transceiver module circuitry does not require as much power in the past and does not need to take up as much space as previous transceiver modules.

Thus, the present invention discloses the use of an off-the-shelf switching regulator with accompanying circuitry to utilize a variable existing input voltage and produce a regulated output voltage. The present invention utilizes fewer parts than known similar power converters, soft start threshold provisions, overload protection, and LED (light emitting diode) performance indicator, and a trimmer for precise output voltage adjustment.

DESCRIPTION OF THE DRAWINGS

For a more complete understanding of the invention, reference may be had to the following detailed description of the invention in conjunction with the drawings wherein.

DETAILED DESCRIPTION OF THE INVENTION

Figure 1:
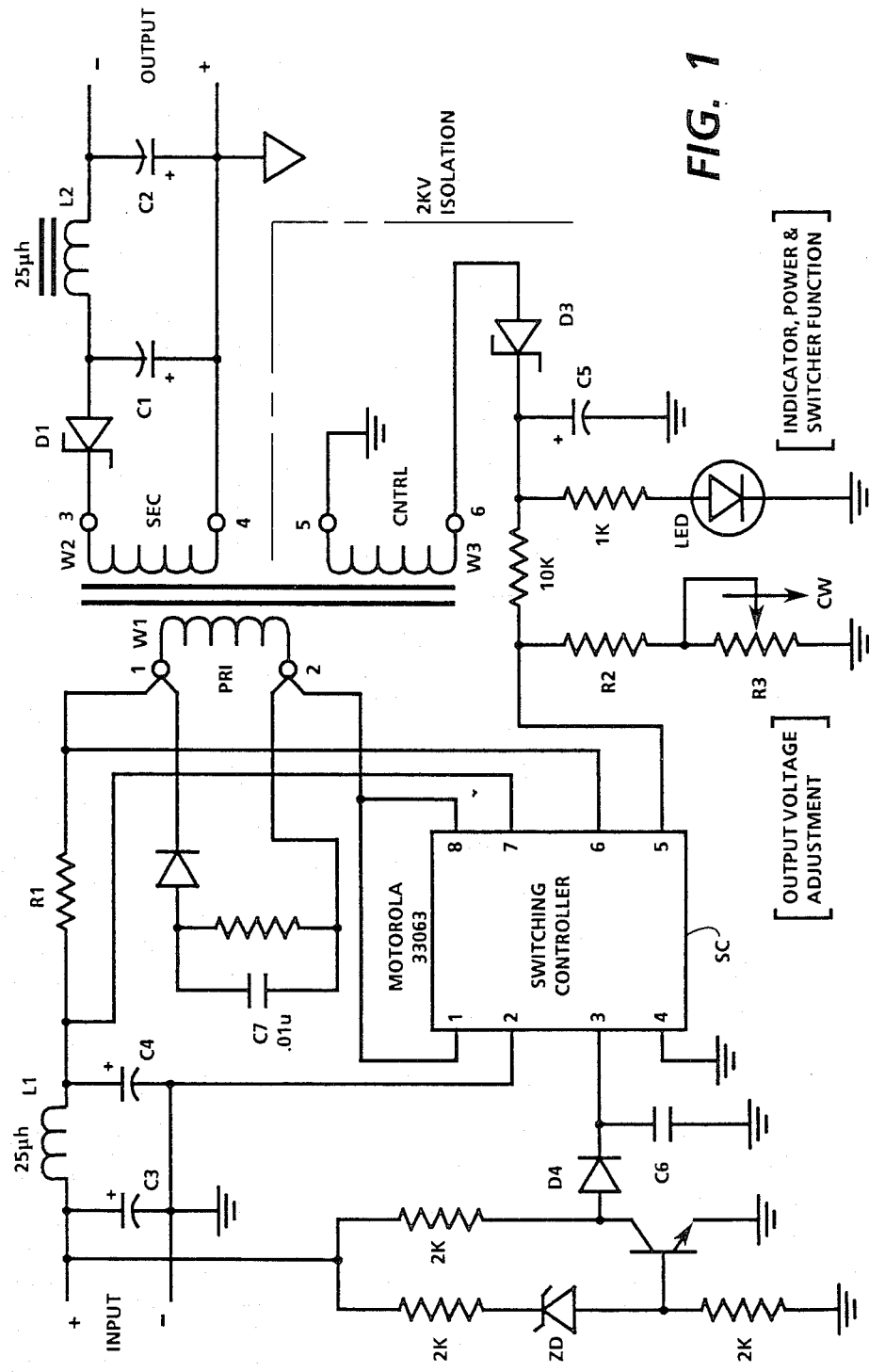
FIG. 1 is a schematic diagram of the DC to DC voltage converter in accordance with the principles of the present invention.

FIG. 1 shows the schematic diagram in accordance with the principles of the present invention. The input to the circuit is a DC voltage from the host station which could vary from about 11 volts DC to about 16 volts DC depending on the host unit coupled to the transceiver module in which the DC to DC converter of the present invention is located. Rather than use this voltage as supplied by the host unit, DC to DC conversion is necessary for the proper voltage translation, independent of the particular host device, since the Ethernet is a party line cable, wherein any one of many different types of host units may be connected to it. The reference for the Ethernet cable or any host station may be exposed to high voltage surges, i.e., from a storm condition providing lightning strikes or from electrostatic discharge. Isolation between the Ethernet cable and each host device must provide protection against these voltage surges so as not to destroy expensive electronic equipment or causes spurious data to appear. Thus, the present circuit also provides for voltage isolation between the secondary winding of transformer T1, Ethernet cable referenced, and the primary/control windings, host referenced. So if a high voltage surge, say 2000 volts, appears accidently on the Ethernet cable, this voltage spike will not be transferred to the primary or control of the circuit, nor to the host device. Alternatively, no voltage surge from the host device will manifest itself on the Ethernet cable, and will not disrupt the operation of any other host device hooked to the Ethernet cable.

Direct current voltage supplied by the host device is presented to the present circuitry at the pi type filter comprising capacitors C3 and C4 and inductor coil L1. The voltage across capacitor C4 is used to supply the DC voltage to the rest of the circuitry. That is, the switching controller SC receives this voltage at terminal 6. The switch within the SC turns on, drawing current from the (+) side of C4, through a sense resistor R1, through the primary side winding W1 of transformer T1, and then through a switch in the controller SC to the (−) side of C4. This switching controller SC could be a Motorola Switching Controller 33063 generally available on the market. That is, the current goes to pins 1 and 8 of the controller SC and then to ground via pin 4. Thus, as the switching controller SC turns on, it draws current through resistor R1, the current ramping up through the primary side W1 of the transformer T1. Whenever the current reaches a predetermined level, the voltage differential across sensing resistor R1 is detected at pins 6 and 7 of controller SC. At said predetermined voltage, on the order of 2/10 of a volt, the controller turns off, interrupting the current flow through the transformer winding W1.

With current flow interrupted through the winding W1, the energy stored in the magnetic field surrounding winding W1 collapses through the transformer secondary windings W2 and W3. This induced voltage in winding W2 now forward biases diode D1, is rectified, and energy is stored by the pi type filter comprising capacitors C1 and C2 and inductor coil L2. With continued commencing and interruption of the flow of current through resistor R1 and the primary W1 of transformer T1, the output of secondary winding W2 continues to reverse, back biasing and then forward biasing diode D1. The output voltage across capacitor C2 is, therefore, the output voltage as designed into the circuitry. Likewise, the induced voltage in winding W3 forward biases diode D3, is rectified, and energy is stored on capacitor C5. Because windings W2 and W3 are closely coupled magnetically, the voltages are reasonably proportional.

The dotted line separating secondary winding W2 from primary winding W1 and contol winding W3 signifies the high voltage isolation built into the transformer T1, seen below in conjunction with FIG. 2. It is seen that winding W3, even though it is essentially a secondary winding, is also protected against a voltage spike on the Ethernet cable. Typical protection would be for a 2000 volt surge.

The time for current in W1 to ramp up to the predetermined level varies with input voltage. Ramp time is also a function of the inductance of winding W1. A typical ramp time is seven to eight microseconds with the described transformer and an input voltage of twelve volts.

When W1 current is interrupted, excess voltage could appear across the switch because diodes D2 and D3 have finite turn on times. Diode D2 and associated parallel R4/C7 provide a short term damping function to protect the switch from excess voltage.

The frequency of cycling, with the components as seen in FIG. 1, would vary between 20,000 and 70,000 times per second depending on the load placed on the output capacitor C2, applied voltage to capacitor C3, and circuit component tolerances. The C1/L1/C2 pi type filter smooths the 20,000 to 70,000 cycles to a regulated output voltage, for example, nine volts, plus or minus five percent. The pi C1/L2/C2 pi filter smooths the cyclical current requirement from the host station supply.

The control winding W3, of course, also detects the 20,000 to 70,000 cycles and charges capacitor C5, typically 2.2 $\mu f$, through diode D3. The load on capacitor C5 is an LED (light emitting diode) which signals to a human operator that the circuit is working properly. The control winding W3 also supplies a voltage divider network of resistor R2 and variable resistor R3. This divider network supplies a signal to switching controller SC at pin 5 to reduce primary energy storage when output voltage is excessive. The higher the voltage at pin 5, the longer the controller SC stays off. Thus, the output voltage across capacitor C2 is regulated with a varying applied load. The output must be maintained at the suggested nine volts but the load and the input voltage to the circuit can vary significantly. This trimmer R3 is necessary due to the fact that the circuit components may not have sufficient accuracy aspects. That is, if the switching controller SC and the resistor R1 have tolerance factors of only five percent, the trimmer divider becomes necessary to adjust to the varying loads on the output.

The zener diode ZD and transistor Q1 circuit coupled to the controller SC is provided to prohibit operation when the input voltage is too low. The resistors and zener diode ZD and transistor Q1 hold a high voltage across capacitor C6, typically 470 $\mu f$, to keep the switching controlling SC off until the input voltage is high enough. The transistor Q1 is held off by the zener diode ZD until the input voltage reaches a predetermined voltage, say ten volts. Then the current flows through zener diode ZD into the base of transistor Q1. This transistor turns on, with its collector now going low, back biasing diode D4, essentially disconnecting the circuit from C6. When this capacitor is charged, the controller SC is inhibited from operating, but with the diode back biased, the controller SC is allowed to run free and can now switch on and off at the operating frequency. This input circuit therefore operates to control the switching controller SC as the incoming voltage is coming up and and to keep it from running and drawing too much current through the primary. Thus, the softstart provision does not allow the DC to DC conversion to proceed until the input voltage is high enough to support the operation of the DC to DC conversion.

If current is drawn through the primary W1 without the switching controller SC operating, there is no voltage buildup in the control winding W3. Therefore, the LED will not light, indicating to the operator that insufficient input voltage is being applied to the circuit for ample DC to DC conversion to take place.

Figure 2:
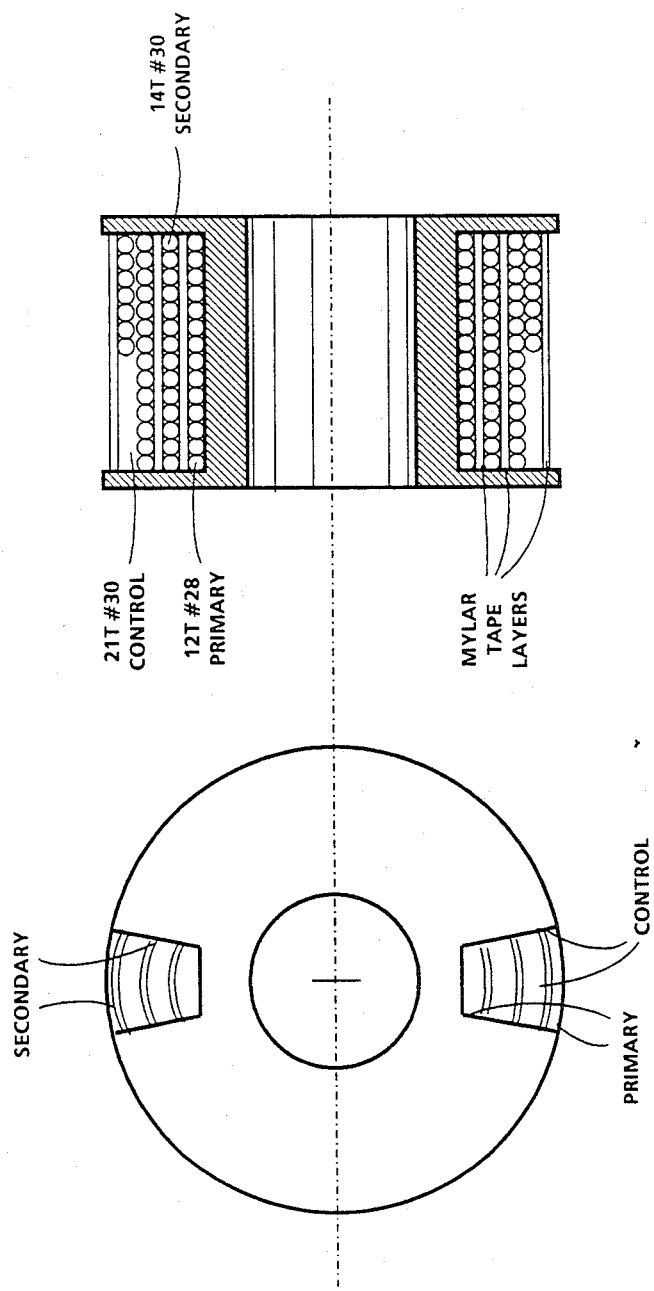
FIG. 2a and FIG. 2b are views of the windings for the custom transformer required by this invention.

FIG. 2 shows the construction of the windings for transformer T1. The primary W1 could be twelve turns of number twenty-eight wire put on the plastic bobbin first. Then the fourteen turns of number thirty wire would be applied for the secondary winding W2. Lastly, the twenty-one turns of number thirty wire would be applied to the bobbin for the control winding W3. Separating the various windings would be sufficient insulation to prevent shorting and also to provide the high voltage voltage surge protection. The order of the windings is important for the transformer. Maximum inductive coupling between the primary W1 and secondary W2 windings is desired. Minimum leakage between the secondary W2 and the control winding W3 so that the voltage provided by the control winding is equivalent or proportional to the output voltage, because the output voltage is being regulated by the control winding W3, but with magnetic connection, not electrical. The iron coupling between the windings are shaped like two cups, pot cores, that fit together and provide the transformer support as well as the magnetic flux carrier. A typical transformer as constructed herein would actually be about one-half inch in diameter. The number of windings disclosed here is exemplary only as it would depend on the desired output voltage as determined by the load of the integrated circuitry to which it supplies the DC to DC converted voltage.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A direct current to direct current power converter comprising:

switching controller means (SC) for cyclically switching an input thereof to an output thereof, sense resistor means (R1) for carrying an applied direct current signal therethrough, transformer means (T1) for transferring an input energy level at its primary winding (W1) to its secondary winding (W2) at a predetermined stored energy level, said primary winding coupled to said sense resistor means (R1) and said input to said switching controller means (SC), said switching controller means (SC) detecting the voltage across said sense resistor means (R1) and turning on and off, thereby interrupting the current through said sense resistor means (R1), said primary winding of said transformer means (T1), and said switching controller means (SC), wherein said primary winding of said transformer means (T1) transfers the stored energy to said secondary winding (W2), input filter means for receiving an input power signal and smoothing it so as to present to said sense resistor means (R1) and switching controller means (SC) said direct current voltage signal to be converted, output filter means coupled to said secondary winding (W2) to smooth said the voltage output with energy pulse transfers across said transformer means (T1) into a regulated direct current signal out, high voltage insulating means in said transformer means (T1) to electrically insulate said primary winding (W1) and a control winding (W3) from said secondary winding (W2) from high voltage surges or spikes which may appear on either of said primary/control or secondary windings, and circuit means coupled to said switching controller means (SC) to monitor the voltage level of the input power signal wherein said switching controller means (SC) would be inhibited from initiating the on and off switching cycle until and unless the input power signal reaches a predetermined level.

2. The direct current to direct current power converter as set forth in claim 1, further including a secondary control winding (W3) on said transformer means (T1) for presenting to another input of said switching controller means (SC) a signal indicative of the operation of said switching controller means, trimmer means coupled to said another input of said switching controller means (SC) to vary the level thereon to control the switching rate of said switching controller means (SC), and a light emitting diode also coupled to said another input of said switching controller means (SC) which will emit light upon correct operation of said converter.

3. The direct current to direct current power converter as set forth in claim 2, wherein said secondary control winding (W3) is also electrically insulated from said secondary winding (W2) from high voltage surges or spikes which may appear on said secondary winding (W2), but is not so insulated from said primary winding.

* * * * *